(12) United States Patent
Chait et al.

(10) Patent No.: US 7,786,702 B1
(45) Date of Patent: Aug. 31, 2010

(54) BATTERY CONDITIONER AND CHARGER

(76) Inventors: Stanley Chait, 522 E. 85th St., New York, NY (US) 10028; Paul Nicholas Chait, 366 Holly Dr., San Rafael, CA (US) 94903

( * ) Notice: Subject to any disclaimer, the term of this patent is extended or adjusted under 35 U.S.C. 154(b) by 566 days.

(21) Appl. No.: 11/489,094

(22) Filed: Jul. 18, 2006

(51) Int. Cl.
*H02J 7/00* (2006.01)
*H02J 7/04* (2006.01)
*H02J 7/16* (2006.01)

(52) U.S. Cl. .................. 320/145; 320/156; 320/137; 320/104

(58) Field of Classification Search .......... 320/152, 320/150, 104, 127, 129, 134, 135, 136, 137, 320/139, 141, 145, 147, 148, 149, 156, 157
See application file for complete search history.

(56) References Cited

U.S. PATENT DOCUMENTS

| | | | |
|---|---|---|---|
| 5,648,714 A * | 7/1997 | Eryou et al. | 320/139 |
| 5,710,506 A * | 1/1998 | Broell et al. | 320/145 |
| 6,172,486 B1 * | 1/2001 | Campagnuolo et al. | 320/141 |
| 6,414,465 B1 * | 7/2002 | Banks et al. | 320/118 |
| 2001/0019257 A1 * | 9/2001 | Bynum et al. | 320/141 |
| 2003/0235759 A1 * | 12/2003 | Honbo et al. | 429/225 |
| 2004/0169489 A1 * | 9/2004 | Hobbs | 320/104 |
| 2004/0189254 A1 * | 9/2004 | Kapsokavathis et al. | 320/132 |
| 2006/0220616 A1 * | 10/2006 | Okuno | 320/131 |
| 2008/0042615 A1 * | 2/2008 | Serrels et al. | 320/101 |

* cited by examiner

*Primary Examiner*—Edward Tso
*Assistant Examiner*—Alexis Boateng
(74) *Attorney, Agent, or Firm*—Larry D. Johnson (57) ABSTRACT

An apparatus for charging either a normal or a sulfated type of a storage battery includes a first charging stage, a second charging stage, and a final third charging stage. The first charging stage applies a pulsed voltage with a high peak and average voltage to the battery until an average current of about 12 amperes is attained, at which time transition into the second charging stage occurs. A pulse width modulator reduces the average voltage and average current to a safe level and continue to charge the battery for about 20 minutes. At that time transition into the third charging stage occurs wherein a low ripple 14.8 VDC steady state current-limited voltage is applied to the battery for a second duration of about four hours, after which charging is complete and the apparatus shuts itself off.

21 Claims, 8 Drawing Sheets

APPENDIX A

APPENDIX B

APPENDIX C

WAVEFORMS AT START OF 2nd STAGE

APPENDIX D

BATTERY CONDITIONER AND CHARGER

BACKGROUND OF THE INVENTION

1. Field of the Invention

The present invention, in general, relates to battery chargers and, more particularly, to the charging and restoration of storage batteries.

Battery chargers are well known devices used for automotive, commercial, marine, aviation, and military applications to restore an electrical charge to a dead or weak battery.

While batteries are used for many purposes, there are three general categories in which they are most often used. The three categories include applications in which the battery (or group of batteries) are used for engine starting, lighting and ignition (hereinafter referred to as "SLI") applications.

Lead-acid storage batteries are the most common of these types of batteries and it is a 12-volt lead acid type of battery that is described herein for use with the instant invention. However, the instant invention is applicable for use with any type and voltage of a battery that can benefit from the improvements herein provided.

With many applications, such as automotive, a battery is typically held near or at its maximum charge capacity by the charging system of the vehicle. When power is drawn from the battery, for example to start the vehicle, it is soon replenished by the vehicle's charging system. This is an ideal operating environment for a battery and maximum battery life-expectancy is usually realized.

However, there are many situations in which a battery is not used for a protracted period of time, or if used, is not recharged. This is especially hard on lead acid types of batteries.

In some cases the batteries are initially charged to capacity but are then left for weeks or months without being used or serviced. The battery naturally loses its charge (i.e., its reserve and starting capacity) by self-discharge from the local action of impurities of the lead plates and interaction with the electrolyte.

This self-discharge is accelerated at elevated temperatures, and will eventually result in a drop in the terminal voltage of the battery, especially below 1.75 volts per cell (10.5V total for a 12V battery).

Once this threshold is reached, and the battery is left for as little as 24 hours without recharge, it results in lead sulfate particles crystallizing on surfaces of the positive and negative plates. These lead sulfate crystals form a high electrical-resistance that is difficult to remove from the battery plates. This tendency is generally well known and is also discussed in U.S. Navy T.O. 8DZ-62-1. The term "sulfate" or a derivative thereof refers to this action.

This crystallized lead sulfate coating substantially increases the internal impedance of the battery. This, in turn, prevents normal battery function from occurring. The battery is no longer capable of delivering sufficient power to a load. Similarly, the high internal impedance affects the ability of the battery to be re-charged.

When a battery charger is connected to a "sulfated" (as it is sometimes referred to in the industry) type of battery, the high internal impedance prohibits re-charging of the battery. The battery charger can remain connected for hours, even days or weeks to no avail. The battery simply will not accept charge current.

In some cases the sulfated battery may gradually begin to accept a charge and be restored but in the vast majority of cases a conventional type of prior art battery charger cannot penetrate the high-impedance sulfated layering that has been deposited on the lead plates of the battery sufficient to dislodge the sulfurous materials or compounds (which are derived from the sulfuric acid) and restore them once again properly back into the electrolyte which includes sulfuric acid. Prior art battery chargers which are used to desulfate are sometimes effective only after very long periods of time after connection. This can often be weeks.

The result is that virtually all sulfated batteries presently are discarded and environmentally hazardous unless properly recycled. Sulfated batteries that have been in vehicles that have not been used or in storage have experienced little or no use are then regarded as useless and are discarded (or recycled). This causes a tremendous waste of resources as well as an enormous financial cost.

The cost to replace a sulfated battery is far more than the mere cost of a replacement battery. The cost of transportation including the time and labor necessary to transport and discard the sulfated battery, the payment of any recycling fees associated therewith, and the cost of transporation, including the time and labor necessary to obtain a replacement battery, add considerably to the cost as does the labor associated with the removal of the old battery and the installation of the new one. Sometimes, the total cost to replace a sulfated battery may be a multiple of the cost of the replacement battery, alone.

There are other causes that contribute to the formation of lead sulfate crystals. Another common cause contributing to the rapid formation of the crystallized lead sulfate coating is by storing a highly discharged battery for even a relatively short period of time, such as 3-4 days, without recharge when an electrical load is also connected to the battery. This is a common problem when lights or other loads are left on batteries for protracted periods of time.

As with self-discharge, high temperatures can further accelerate the sulfating problem. In either case the high resistance crystallized lead sulfate coating eventually results in a "dead" battery with high internal impedance that can not typically be recharged. The sulfated battery may still present some voltage at the battery terminals, but because of the high internal resistance it cannot supply anywhere near a normal current draw, and is therefore considered as dead regardless of whether there is any voltage present at the terminals.

Also, in some cases a conventional type of a battery charger requires a minimum voltage to be present at the battery terminals in order for the charger to even begin to set-up to deliver a charging current to the battery. This may be to ensure that the charger is properly connected to the "right" type of battery, etc., prior to commencing a charge cycle.

Battery chargers are increasingly becoming more sophisticated in operation and these types of operating safeguards are being incorporated into many types of battery chargers to ensure safe operation. Batteries contain a great deal of energy. They can emit hydrogen gas, which is explosive. Accordingly, the safe charging of batteries is potentially of life and death criticality.

A dead sulfated battery may present a terminal voltage that is equal to or close to zero volts. Accordingly, certain prior art types of battery chargers will not even attempt to deliver a charging current to such a battery.

In other cases, the terminal voltage of the battery may range from about one and one-half volts DC to a high of about eight or at most nine volts DC for a partially discharged sulfated type of battery. Even this range may present too low a terminal voltage to permit many types of prior art battery chargers from functioning.

Even if a standard type of a battery charger will set-up and attempt to deliver a charging current, the battery's high internal impedance (electrical resistance) will prevent a sufficient charge current from flowing into and through the battery.

The charger may remain connected, as mentioned above, to the battery for days without charging the battery, with current flows in the microampere or low milliampere rate.

Sometimes when this occurs, the battery may eventually begin to receive charge by gradually "ramping-up" the rate of charge as the lead sulfate crystals gradually break down sufficient to lower the battery's internal impedance. However, this could take days and sometimes weeks to occur. A protracted charging period wastes both energy and manpower.

However patient a person may be, usually there is never any substantial decrease in internal resistance of the sulfated battery, regardless of how long a conventional type of battery charger is connected. Because the internal impedance remains high, the battery is never able to accept a sufficient charging current. Accordingly, these types of batteries must presently be scrapped.

These general types of battery problems are universal worldwide in transportation, industry, passenger vehicles, military and elsewhere.

Any attempt to rejuvenate a dead or a sulfated battery is often referred to as either "restoring" or "conditioning" the battery. As used herein the terms, "conditioner", "condition", and "conditioning" are intended to include any restoring or rejuvenating activity or similar effort that is intended to add an electrical charge or otherwise improve the performance of a sulfated or discharged battery.

Similarly the terms, "sulfate", "sulfated, "sulfating," etc. as used herein, are intended to refer to a lead acid type of battery and the occurrence of sulfate crystals anywhere on the lead plates of the battery.

Accordingly, there exists today a need for battery conditioner and charger that can help ameliorate the above-mentioned problems and difficulties.

Clearly, such an apparatus would be a useful and desirable device as would a method to rejuvenate a sulfated battery.

2. Description of Prior Art

Battery chargers are, in general, known. While the structural arrangements of the above described known devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a battery conditioner and charger that can restore a sulfated battery.

It is also an important object of the invention to provide a battery conditioner and charger that can condition a sulfated battery.

Another object of the invention is to provide a battery conditioner and charger that can restore charge to a sulfated battery.

Still another object of the invention is to provide a battery conditioner and charger that can charge a normal, healthy type of a battery. The high peak amplitude and high energy pulses at relatively low frequency provide the ability of penetration into minute (micro) recesses of the active material, thus restoring a greater amount of material in a shorter period of time to its original charged state. This assures that the total amount of material is restored with average ampere hours required to charge being closer to the ampere hours removed from the battery during discharge. Therefore, charge efficiency is higher with this invention than by prior art chargers.

Still yet another object of the invention is to provide a battery conditioner and charger that provide a method of restoring a sulfated battery to normal operation.

Yet another important object of the invention is to provide a battery conditioner and charger that reduce the time to condition a sulfated battery.

Still yet another important object of the invention is to provide a battery conditioner and charger that include a thermal sensor to monitor temperature of a battery being charged and which will cease the charging of the battery if its temperature exceeds that of a threshold amount.

A first continuing object of the invention is to provide a battery conditioner and charger that includes a method to permit overnight or unattended charging with automatic shut-off of the charger after a predetermined period of time has elapsed.

A second continuing object of the invention is to provide a battery conditioner and charger that includes at least two charging stages, a first stage thereof including the application of a high energy pulsed waveform to the battery.

A third continuing object of the invention is to provide a battery conditioner and charger that includes three charging stages wherein a first stage includes the application of a high energy pulsed waveform to the battery until a predetermined threshold average current is reached.

A fourth continuing object of the invention is to provide a battery conditioner and charger that includes three charging stages wherein the first and second stages include a high energy pulse-width modulated waveform that is applied to the battery for a first predetermined period of time.

A fifth continuing object of the invention is to provide a battery conditioner and charger that include three charging stages wherein a third stage includes a steady-state DC waveform that is applied to the battery for a second predetermined period of time.

A sixth continuing object of the invention is to provide a battery conditioner and charger that includes a timer which shuts off the battery conditioner and charger after four hours of charging have elapsed.

Briefly, a battery conditioner and charger that is constructed in accordance with the principles of the present invention is adapted to supply an electrical charge to a battery in three distinct charging stages. The first charging stage is entered automatically upon turning on the battery conditioner and charger after connection to a storage battery has occurred. Each subsequent charging stage is automatically entered into by the battery conditioner and charger after a determination is made that completion of the previous charging stage has occurred. The first two stages are pulsed with voltage spikes that include peaks that are higher in voltage and current than previous prior-art types of battery chargers have been able to apply to the battery without also damaging the battery. This is currently accomplished by safely regulating the average amount of energy that is applied to the battery during the application of a pulsed DC waveform. The first stage includes a pulsed DC waveform with a very high DC average voltage (21 volts for a 12 volt battery) and a high peak voltage of 42 volts. The second stage includes pulse width modulation to limit (i.e., lower) the duty cycle of the pulsed DC waveform and therefore to also limit the average amount of energy that is applied to the battery. The average voltage of the second stage is limited to prevent deleterious gassing of the battery. The second stage takes effect only after a predetermined average charge current has been established by the first stage. The first two stages are useful in restoring or reconditioning sulfated batteries that would otherwise resist or prevent a charging thereof. Transition from the first charging stage into the second charging stage occurs as soon as the battery is able to accept a predetermined average rate of charge (i.e., a threshold average current). The transition from the first charging stage into the second charging stage occurs within a very short period of time, typically in less than 3 seconds, when charging a type of a battery that is not sulfated. The time for transition from the first charging stage into the second charging stage is considerably longer for sulfated or partially sulfated batteries, often requiring about twenty minutes duration for the first charging stage to break through the crystallized lead sulfate. Transition from the second charging stage into the third charging stage occurs after a predetermined period of time has elapsed. The third stage includes the application of a typical steady-state DC, prior-art type of a charging cycle that continues until the absorption phase of charging is complete, with tapered to a steady low level. A second period of time is a back-up to assure that charge is completely cut-off. The second period of time has elapsed which is generally sufficient to complete the charging of the battery to a satisfactory level of charge in most instances. As a safety mechanism to guard against a battery that includes an internal short or other serious internal defect, a temperature sensor is preferably used to monitor the temperature of at least one of the individual cells of the battery and means are provided to turn the battery conditioner and charger off in the event a predetermined maximum temperature is reached by the battery. When the temperature of the battery drops back down to a safe predetermined minimum temperature, the previous charging stage resumes. Accordingly, unattended charging is possible for both sulfated and normal (non-sulfated) types of batteries.

The very high power pulses and their relatively low repetition rate generated by the instant invention allow a breakthrough of the crystalline coating in a short period of time, typically less than one hour. The pulse repetition rate allows deep penetration to the plates, and the transition average voltage prevents battery gassing.

BRIEF DESCRIPTION OF THE DRAWINGS

Appendix A includes a preferred regulator schematic and pulse width modulator diagram.

Appendices B, C, and D are additional sample waveforms.

DETAILED DESCRIPTION OF THE INVENTION

Figure 1:
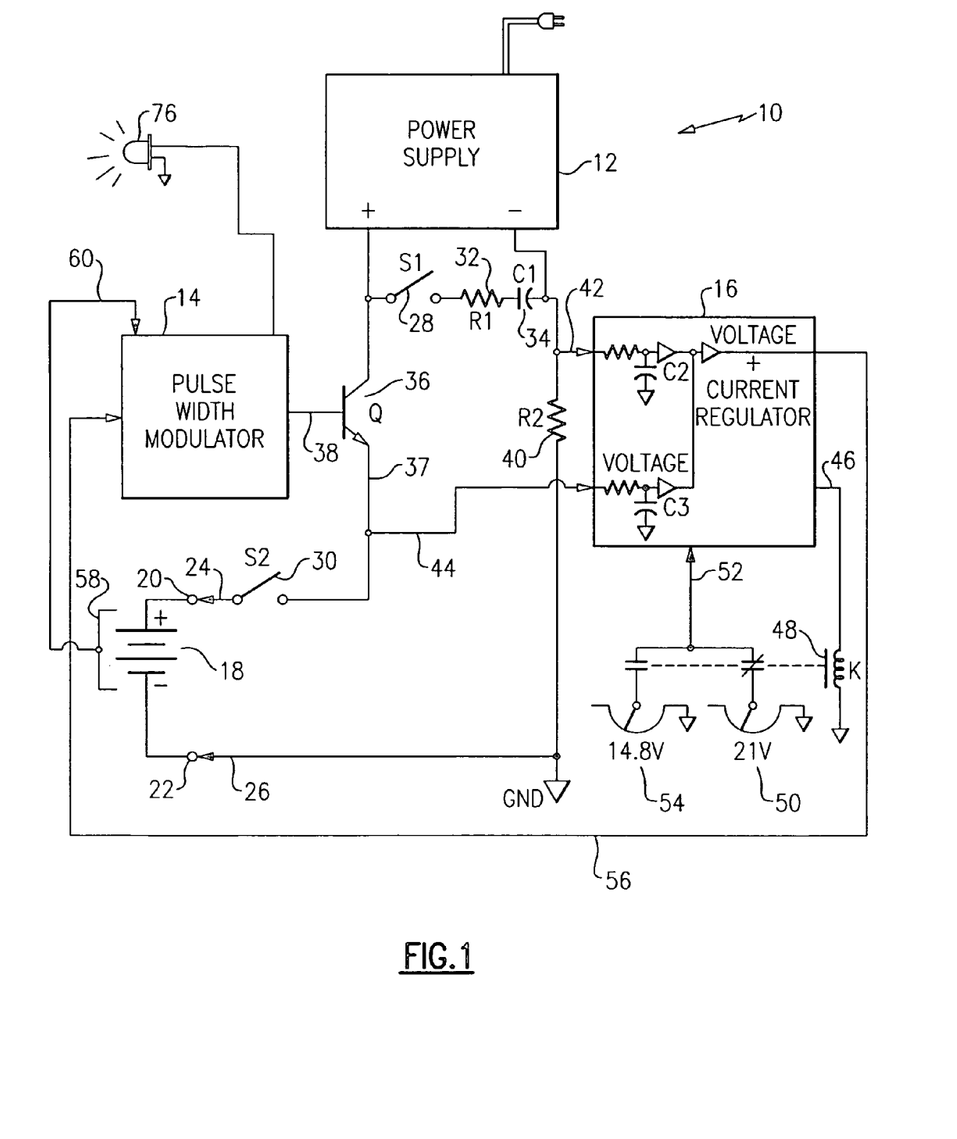
FIG. 1 is a block diagrammatic view of a battery conditioner and charger with a minimal amount of enabling circuitry also included.

Referring on occasion to each of the drawing figures and in particular now to FIG. 1 is shown, a block diagrammatic view of a battery conditioner and charger, identified in general by the reference numeral 10.

A power supply 12, a pulse width modulator 14, and a voltage and current regulator 16 a high capacitance value capacitor and current limiting high wattage resistor are the primary component parts of the battery conditioner and charger 10.

A battery 18 that is to be charged includes a positive terminal 20 and a negative terminal 22 to which a positive power output 24 and a negative power output 26 of the battery conditioner and charger 10 are connected by suitable clip (not shown) or other means, as desired.

A minimal amount of control circuitry is shown intermediate the power supply 12, the pulse width modulator 14, the voltage and current regulator 16 and the battery 18 to illustrate one possible embodiment of the battery conditioner and charger 10.

The power supply preferably provides a clean, ripple-free output regulated at 42 VDC and current limited to not exceed 30 amperes.

During normal use when the battery conditioner and charger 10 is connected to the battery 18 a first switch, identified as S1 28 and a second switch, identified as S2 30 are both disposed in the closed position.

A first resistor, identified as R1 32 is a high wattage current limiting resistor rated at 300 watts and 0.2 ohms. It and the S1 28 are connected in series with a first capacitor, identified as C1 34. C1 34 is of high capacity, preferably 100,000 microfarads. S1 28, R1 32, and C1 34 are connected across the 42 VDC output of the power supply 12 and, when a first transistor, identified as Q 36 is off (i.e., non-conducting), C1 charges to the maximum power supply voltage of 42 volts in accordance with the time constant R1-C1, as is well known in the electronic arts.

The pulse width modulator 14 includes a pulse width control output 38 that is used to control (turn on or off) Q 36. When Q 36 is turned on, both the maximum output of the power supply (up to 30 amperes) in addition to the energy of charge stored in C1 34, are available to combine together and to flow through Q 36 and through a transistor output 37, through S2 30 and attempt to charge the battery 18.

If the battery is highly sulfated its internal resistance will be very high and initially no or very little current will be able to flow through Q 36 and the battery 18.

However, if the battery 18 is not sulfated but is generally capable of accepting a charge current that is in proportion to the voltage that is applied across its terminals (i.e., if the battery 18 is at least partially discharged) it will include both low internal impedance and low back electro-motive force (EMF). Accordingly, if it were not for the current limiting resistor R1 32, a peak current of a few hundred amperes would be available to flow through the battery 18. If the capacitor were not in the circuit, S1 28 open, only lower peaks would be available.

This high a current is excessive and can potentially damage the equipment or battery 18. Accordingly, current limiting resistor R1 32 limits the current to a maximum peak of from about 80 to about 100 amperes (typically about 90 amps).

A second resistor R2 40 is a low resistance shunt that generates a millivolt drop across itself that is in proportion to the current flowing through the battery 18. This proportionate millivolt drop is filtered and referenced to an average preset millivolt value through a differential amplifier to provide an average current value over time that is flowing through the battery. The average current takes into the account the duty cycle of a first pulsed voltage waveform (See FIG. 3) that is applied by the pulse width modulator 14 to Q 36 and therefore to the battery 18.

R2 registers one millivolt per ampere of current flow (0.001 ohms). Therefore, other than to provide an indication of current flow through the battery 18 its effect in series with the battery is minimal.

A shunt resistor output 42 provides an indication to the voltage and current regulator 16 as to the average current that is flowing through the battery 18.

Similarly a voltage output 44 from the transistor output 37 is supplied to the voltage and current regulator voltage 16. Feedback and capacitor C3 provides the average voltage that is applied, over time, to the battery 18.

The voltage and current regulator 16 includes a threshold average voltage output 46 that is used, when activated, to energize a relay, identified as K 48.

When K 48 is not energized, which occurs in stage 1, a 21 volt average reference 50 is applied to a reference voltage input 52 of the voltage and current regulator 16.

When K 48 is energized, which occurs in stage 2, a 14.8 volt reference 54 is applied to the reference voltage input 52 of the voltage and current regulator 16.

A voltage and current crossover output 56 from the voltage and current regulator 16 is applied as an input to the pulse width modulator 14.

A thermal sensor 58 (thermocouple or other similar device) is preferably attached to a plate that is placed over or proximate the battery 18. The thermal sensor 58 preferably includes a shape that corresponds with the top of the battery 18 and means for monitoring the temperature of at least one cell of the battery 18, and preferably all of the cells.

The thermal sensor 58 includes a thermal output 60 that is supplied to the pulse width modulator 14 (or where desired) of the battery conditioner and charger 10 sufficient to stop conduction of Q 36 and hence disable all charge (i.e., no voltage or current is applied) that is being applied to the battery 18 in the event a predetermined maximum temperature is reached by the battery 18. When the temperature of the battery 18 falls to a safe predetermined minimum temperature, the battery conditioner and charger 10 resumes its charging of the battery 18.

If the battery 18 has an internal short or other serious defect, the temperature can increase substantially. Accordingly, an out-gassing of potentially explosive hydrogen gas can occur. The thermal sensor 58 and the thermal output 60, as used, prevent this from occurring.

The preferred predetermined maximum temperature is 113 degrees Fahrenheit, at which point (i.e., when that temperature is reached by any portion of the battery 18) charging ceases. The preferred predetermined safe minimum temperature is 85 degrees Fahrenheit, at which point charging resumes.

The battery conditioner and charger 10 include three distinct charging stages, as are described in greater detail hereinafter.

For a second charging stage, if the average of the voltage that is flowing through the battery 18 is deemed to be excessive (based on the average reference voltage input 52 that is being applied to the voltage and current regulator 16, and which is described in greater detail hereinafter), the pulse width modulator 14 will utilize the voltage and current crossover output 56 to lower the duty cycle that is being applied to the battery 18.

Conversely, during the second charging stage if the average of the voltage that is flowing through the battery 18 is deemed to be below the desired average value, the pulse width modulator 14 will utilize the voltage and current crossover output 56 to increase the duty cycle that is being applied to the battery 18.

Figure 6:
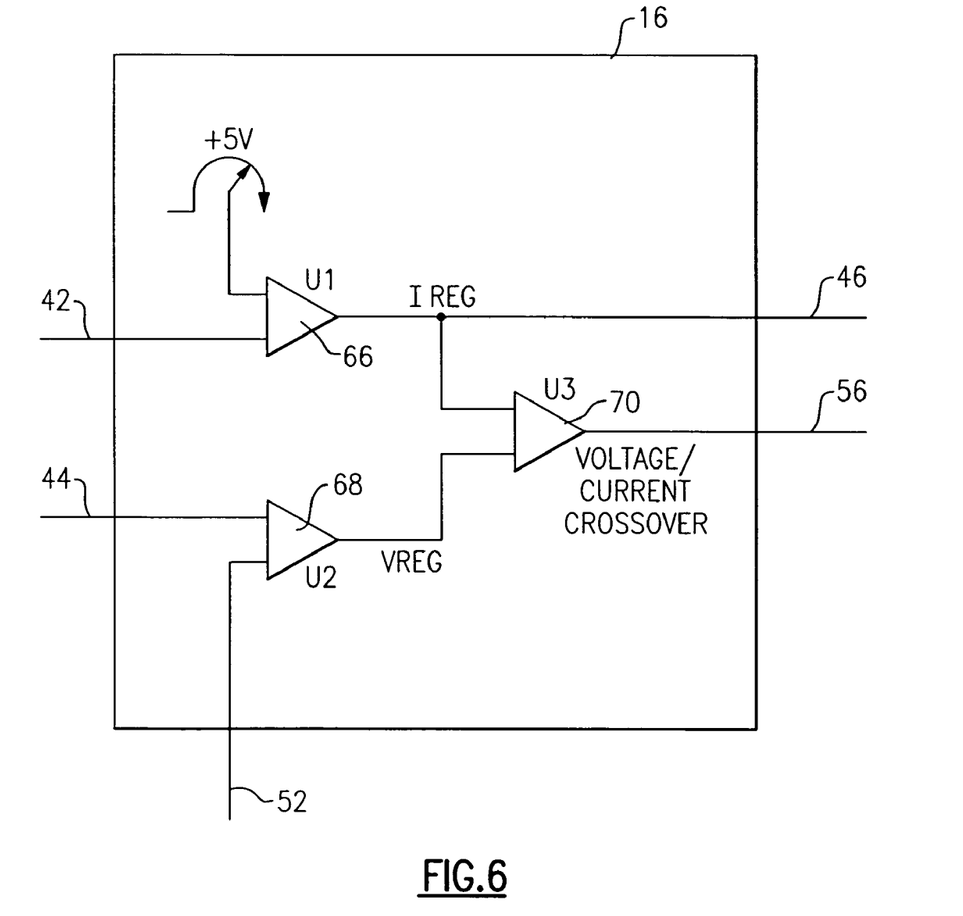
FIG. 6 is a simplified schematic of the voltage and current regulator of FIG. 1.

Refer to FIG. 6 for a simplified schematic of the voltage and current regulator 16, absent the capacitance that is connected to each of the inputs thereof in order to provide average values for the voltage and current regulator 16 to use as it sets its own output 56.

Figure 2:
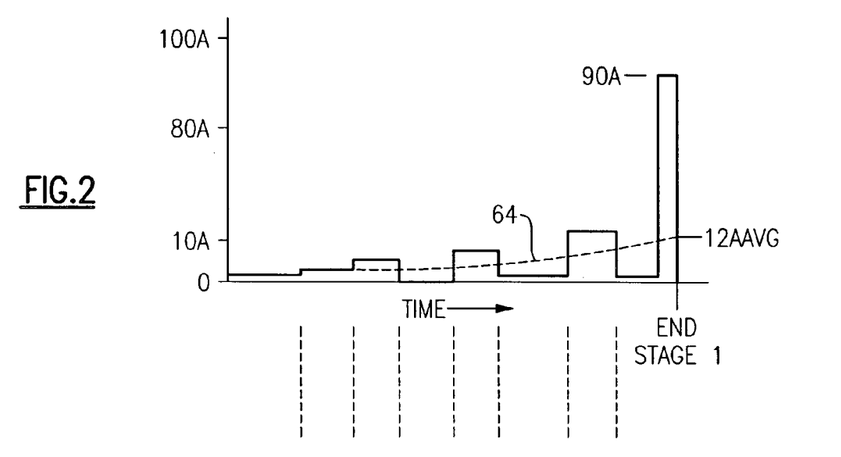
FIG. 2 is a sample current waveform that is applied to a sulfated battery during the first stage.
Figure 3:
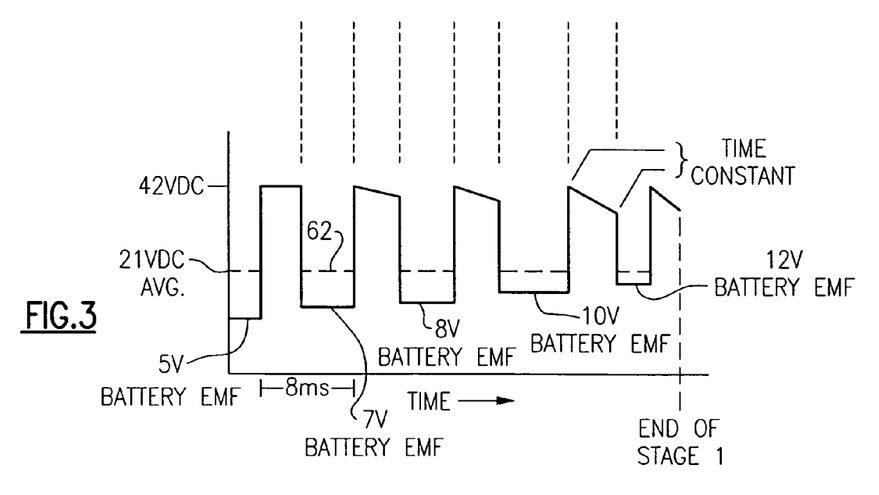
FIG. 3 is a sample voltage waveform that is applied to a sulfated battery during the first stage.

Referring now simultaneously to FIG. 2 and FIG. 3 are shown a possible current waveform in FIG. 2 and a possible corresponding voltage waveform in FIG. 3 as applied initially to a sulfated type of the battery 18. Operation is discussed initially for the restoration and charging of a sulfated type of the battery 18 and later for a non-sulfated type of the battery 18.

A pulsed DC waveform with 42 VDC peaks at about a 50% duty cycle is applied to the battery 18. Accordingly, an average voltage of 21 VDC (half the peak voltage) is being applied to the battery 18 initially, as shown by dashed line 62.

Because the battery 18 is highly sulfated, its internal resistance is high. A normal voltage from a conventional prior art type of a battery charger of from 15 to a maximum of about 18 VDC will not result in a sufficient potential to affect the sulfated plates of the battery 18. Accordingly, the battery 18 would likely never accept a charge.

However, over the course of time the high voltage peaks (42 VDC) combined with the pulsed input of the battery conditioner and charger 10 begin to find pin-holes in the plates that are less sulfated. The high voltage peaks begin to force current through those pin holes which begin to expand in area and which progressively result in a lowering of the internal impedance of the battery 18.

FIG. 2 and FIG. 3, as shown, illustrate a progression of charging capacity that normally takes up to about 20 minutes to occur. However for the purposes of clarity, that somewhat lengthy time progression has been reduced to only a few DC pulses.

Observing the tops of the DC pulses, as the internal impedance of the battery 18 begins to diminish, the battery begins to accept increasingly more current. This increase in current is shown by an increasing slope at the tops of the DC pulses that is representative of the overall resistance-capacitance time constant of the entire system. The overall time constant includes the combined time constants of the power supply 12, that of the battery 18 (which includes a rapidly changing internal impedance and rising back EMF), the R1 32, C1 34 time constant, and the remaining component parts of the battery conditioner and charger 10 to a lesser degree.

As energy is removed from the battery conditioner and charger 10 and increasingly supplied to the battery 18 as it begins to accept an increasing rate of charge, the overall time constant is reflected in an increasing slope on top of the DC current pulses.

Similarly, the peak current flowing through the battery 18 increases from an initial value of only a few mill-amperes into the amperes range, and eventually to as much as about 90 amperes.

A second dashed line 64 shows the progressive increase of the average current (rate of charge) that is being accepted by the battery 18.

Regardless of how high the peak current may reach, once the average current through the battery 18 reaches 12 amperes, transition from the first charging stage into the second charging stage occurs automatically.

This first transition is dependent on the average current that is flowing through the battery 18. With a typically sulfated type of the battery 18 the duration of the first charging stage will be about 20 minutes. With a partially sulfated type of the battery 18 the duration of the first charging stage will typically be less than 20 minutes. With a severely sulfated type of the battery 18 the duration of the first charging stage can take longer than 20 minutes to result in the necessary average current through the battery 18 of twelve amperes for the first transition to occur.

Accordingly, these variable periods of time have been greatly compressed in the FIG. 2 and FIG. 3 drawings.

However, when the battery 18 is not sulfated but is capable of accepting a normal rate of charge, the average current, as shown by the second dashed line 64 (FIG. 2) can reach 12 amperes in milliseconds due to the low internal impedance of the battery 18, its back-EMF, and the high voltage that is being applied across the terminals 20, 22. Accordingly, the transition into the second charging stage will occur almost instantaneously with a normal type of the battery 18 that is not sulfated.

This allows use of the battery conditioner and charger 10 with either sulfated or non-sulfated types of the battery 18 without any change in settings being required. The battery conditioner and charger 10 is able to automatically adjust and vary its charging pattern depending on the state of charge and acceptance of charge of the battery 18 it is connected to.

It is important to note that a pulsed DC waveform is far more effective at breaking down and through the sulfated plates than is a steady state voltage, regardless of its amplitude. It is also safer for the battery 18.

While any pulse repetition rate is possible from less than 60 pulses per second to over 400 pulses per second, a preferred range for the repetition rate is from about 120 pulses per second to a high of about 400 pulses per second. It has been observed that there is little difference in efficacy of the battery conditioner and charger 10 within this range of possible pulse repetition rates. These relatively low frequencies allow deeper penetration of the plate surfaces and sufficient time for ionic exchange.

Transition from the first charging stage into the second charging stage occurs when there is a twelve mill-volt drop (on average) across the second resistor R2 40.

At that time operational amplifier U1 66 toggles so that threshold average current output 46 is energized. This, in turn, energizes the relay K 48.

Prior to an energizing of the relay K 48, the average reference voltage input 52 that is applied to operational amplifier U2 68 is 21 volts. The outputs of current regulating U1 66 and voltage regulating U2 68 are supplied as inputs to operational amplifier U3 70. Accordingly, the output of U3 70 is the voltage and current crossover output 56 and it is supplied to the pulse width modulator 14.

Therefore, the pulse width modulator 14 will limit the duty cycle of the pulsed waveform, as required, to seek whatever reference voltage input 52 is presently being applied to U2 68.

When the battery conditioner and charger 10 is in the first charging stage, the reference voltage input 52 is 21 VDC. Because that average voltage (21 VDC) is attained only at a 50% duty cycle with a maximum DC input voltage of 42 VDC, the pulse width modulator 14 sets the duty cycle during the first charging stage to 50%.

However, when the relay K 48 is energized, the reference voltage input 52 changes to 14.8 VDC. Accordingly, the voltage and current crossover output 56 of U3 70 supplies a feedback signal to the pulse width modulator 14 that results in a decrease of the duty cycle that is applied to the battery 18.

FIG. 3 also shows that a residual battery back-EMF may prevent the pulses from dropping to zero volts. As many factors affect whether this may occur and to what extent, it is not shown in all of the drawing figures.

Figure 4:
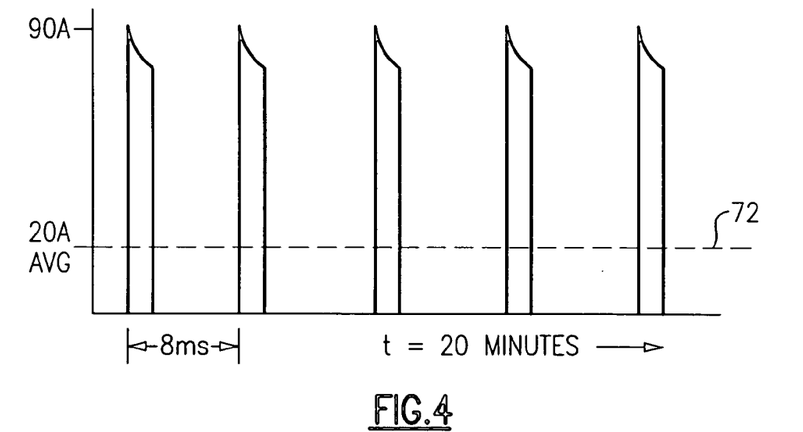
FIG. 4 is a sample current waveform that is applied to a sulfated battery during the second stage.
Figure 5:
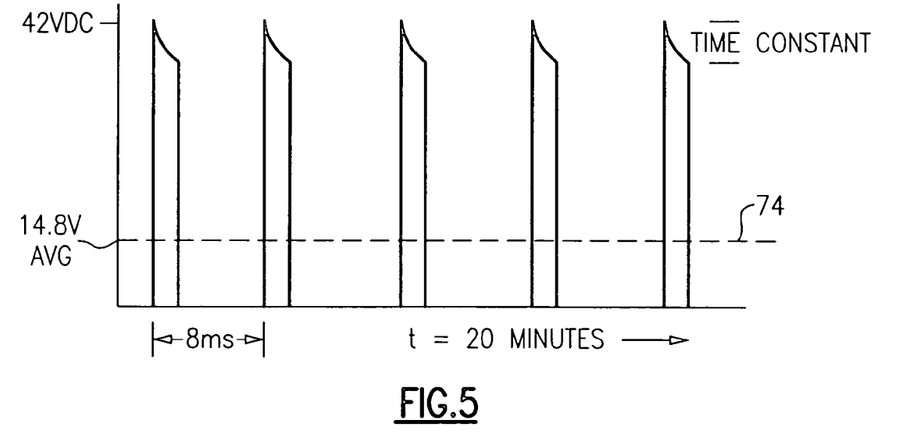
FIG. 5 is a sample voltage waveform that is applied to a sulfated battery during the second stage.

Referring now also to FIG. 4 and FIG. 5, is shown a third dashed line 72 whereby the average current is limited to 20 amperes, even though peak currents of as high as about 90 amperes may be flowing through the battery 18. It is these high voltage and high current peaks and their resultant average value that continue to recondition and to restore sulfated types of the battery 18 back to normal operation.

Similarly, the average voltage during the second charging stage is limited to 14.8 VDC, as set by the pulse width modulator 14 and as shown by a fourth dashed line 74.

This provides a substantial and unexpected benefit. Even though very high voltage and current peaks are being applied to the battery (in both the first and second charging stages) the average amount of energy that the battery 18 can receive is limited by the battery conditioner and charger 10 to a safe level, so that excess gassing does not occur.

During the second charging stage, the 20 ampere maximum average current and the 14.8 VDC average voltage prevents overheating or overcharging of the battery 18 that could result in gassing or other damage to the battery 18.

This, therefore, provides an effective constant potential, current limited charging cycle to the battery 18 that is useful for both sulfated and non-sulfated types of the battery 18. It is believed that the high current peaks ensure proper charging and capability for the battery 18 when it is of a normal type. Stated in other words, the second charging stage is more effective at charging normal types of the battery 18 than are previous methods. Perhaps this is because the second charging stage removes impurities and small sulfate deposits and trapped gas in micro recesses that are on even normal types of the battery 18 than other, prior art types of charging methods.

Additionally, the second charging stage is used to remove the remaining bulk of sulfate deposits from a sulfated type of the battery 18 after the battery 18 has begun to accept a reasonable rate of charge.

The second charging stage occurs for a predetermined first period of time. The present preferred time interval for the second charging stage is twenty minutes for batteries up to about 80 amp-hrs, and up to an hour for 120 amp-hr batteries. After twenty minutes have elapsed, the battery conditioner and charger 10 will experience a second transition from the second charging stage into the third charging stage.

The third charging stage is not shown in the drawings because it includes a prior-art type of smooth DC charge of about 14.8 to 15.0 VDC that is applied to the battery 18 for a second predetermined period of time. The second predetermined period of time is about four hours. After a total of four hours of total charging time including first, second and third charging stage have elapsed, the battery conditioner and charger 10 turns itself off. However, the battery usually does not require 4 hours of charge, but may be removed from the conditioner/charger when the charge current has tapered to under approximately 1.5 amperes.

The voltage and current regulation of the battery conditioner and charger 10, combined with the first and second periods of time, and the thermal sensing abilities, allow safe, unattended use of the battery conditioner and charger 10, whether it is used to charge sulfated or normal types of the battery 18.

Additionally, a very high salvage and return to usage rate for sulfated types of the battery of about 80% is attained by the battery conditioner and charger 10. This provides a substantial improvement over the known prior art.

A brief discussion of the first and second charging stages and, in particular, the benefit for use with a sulfated type of the battery 18 is included to further clarify operation of the battery conditioner and charger 10.

When the battery conditioner and charger 10 is first switched-on, the first charging stage is entered and a high voltage is impressed across the terminals 20, 22 of the battery 18. For example, a plurality of high sharp peak voltage pulses with 120-400 pulses per second are placed across the battery terminals 20, 22. The high voltage peaks quickly begin to penetrate through pin-points in the sulfate crystal areas that would otherwise have had too high a resistance value for a lower normal charge voltage (14.8V) to affect.

The short duration high voltage peaks cause high peak currents to flow through these pin-points. Current spreads-out from these pin-points to encompass an ever increasing plate area (in the battery 18) as the crystal structures continue to break-up.

These peak currents at very narrow pulse widths may include peak amplitude currents of up to about 90 amperes peak due to the high voltage that is applied across the battery terminals. The battery conditioner and charger is regulated to limit the maximum available peak current to from 80 to 100 amperes. This is based on the maximum output of the power supply 12 plus the maximum charge held by C1 34 and the resistance of R1 32.

The battery conditioner and charger 10 continues to cause the sulfate crystals to break up which progressively results in the lead plates having an increasing area that is not sulfated and therefore of lower impedance (resistance).

Accordingly, the current continues to progressively increase during the peak voltage amplitude spikes (i.e., peaks). The pulsing and resultant crystal break-up can also cause excess heat generation in the batteries if dendrite and small particle formation had taken place during sulfating. Such formations can cause a short circuit condition to occur between the positive and negative electrodes.

The pulsing (as opposed to prior art types of battery chargers) helps to eliminate these formations until the plates, electrodes, and electrolyte of the battery 18 are normalized.

However, in order to prevent excess heating, the thermal sensor 58 is attached to the temperature sensing plate and placed preferably on top of the battery 18 to monitor its temperature. The temperature sensing plate preferably includes a contour (shape) that conforms to the contours of the top, bottom or sides of the battery 18 and has one each of a plurality of the thermal sensors 58 for monitoring the temperature disposed directly at the top of each cell.

At 113° F., the charging/conditioning currents cease, but after cooling to 85° F., the current resumes. As more current is being accepted, the average current increases until the battery 18 is accepting about 12 amperes average current.

At this time, the first transition occurs which reduces the pulse width of the pulsed voltage waveform that is applied to the battery so that the average voltage applied drops from 21 volts to 14.8 volts DC. The pulses still exist, and average current is now limited so as not to exceed about 20 amperes.

Accordingly, the battery, while being pulsed with very high amplitude DC pulses, is subjected to only an average voltage of 14.8 volts, or 2.47V per cell. Therefore excess gassing from overcharging does not occur.

The pulsing constant average current of 20 amperes for the second charging stage is allowed to continue for a period of 20 minutes. Since the battery was presumably initially discharged, this time period is insufficient to fully complete the charge.

However, the battery is now generally capable of accepting a normal type of charge. Therefore, in order to relieve the internal stresses to the battery from the current pulses, including possible dendrite and other particle formation that could possibly shorten the life or decrease the capacity of the cells or cause excessively high temperatures to occur, a second transition takes place into a third charging stage.

A green indicator lamp signals this transition by illuminating the legend "Conditioned/Charging." This informs anyone who observes the battery conditioner and charger 10 that if it is connected to a sulfated type of the battery 18, the battery 18 has now been conditioned (i.e., restored to normal operation) and is now in the third charging stage accepting a normal type of a charge.

The third charging stage includes the application of a pure DC low ripple constant potential charge of 14.8 volts of up to about 30 amperes maximum from the power supply 12 to charge the battery 18 for up to four hours from initiation of the first stage. As the battery 18 continues to assume increasing charge, its back EMF increases (as is known in the battery charging arts) and, accordingly, the amount of current that the battery 18 will accept when a steady-state 14.8 VDC potential is applied thereto will proportionately decrease until the battery 18 is fully charged or nearly so.

The rate of charge in the third charging stage is a standard medium-high charge current rate and voltage for a non-sulfated, partially discharged, "healthy" battery of this type.

Accordingly, a previously unusable sulfated battery is restored to normal operation.

For volume battery requirements where there are many sulfated types of the battery 18 that require conditioning, as has been occurring in the U.S. military, the battery 18 may be removed from the battery conditioner and charger 10 as soon as the LED 76 light illuminates. The battery will now have been fully restored, rejuvenated, de-sulfated and conditioned, although it is not, as of yet, fully charged.

Accordingly, the battery 18 may now be removed from the battery conditioner and charger 10 and charged to completion using a prior art type of a conventional battery charger (not shown). Another benefit, therefore, of the battery conditioner and charger 10 is that it can be used to condition a sulfated type of the battery 18 sufficient so that it can then be normally charged using a prior art type of battery charger.

When the conditioned (or a normal battery that was not sulfated) is allowed to remain on the battery conditioner and charger after the LED 76 light illuminates it charges normally. The battery conditioner and charger supplies a smooth DC charging until the battery is fully charged.

It is generally agreed in the industry that a full charge is attained when the battery voltage is at 14.8 volts and the charge current tapers down to less than 1.5 amperes.

However, this type of a full charge, while considered full in the industry is not indicative of the absolute maximum charge that the battery 18 can possibly attain. To truly reach 100% of the charge potential that the battery 18 is capable of attaining, a final absorption charge is used to add the last two or three percent of battery charge necessary to attain a 100% fully charged battery 18. The final absorption charge is not always required.

However, if the battery 18 is allowed to remain on the battery conditioner and charger until completion of the third charging stage has occurred (about four hours total from initiation of the first stage) the final absorption charge will typically also have occurred. The four hour timer provides a safety back-up that allows for overnight or unattended charging.

As mentioned above, when the battery conditioner and charger 10 is connected to a healthy, normal battery 18 (one that is not sulfated), the transition from the first charging stage to the second charging stage occurs rapidly because there is no delay associated with breaking up crystalline structure. Accordingly, the battery conditioner and charger 10 is equally well suited for use with sulfated or non-sulfated types of the battery 18.

If the battery conditioner and charger 10 is used to charge storage or other types of the battery 18 that have a significantly different rating, the general limits, as described hereinabove, can be modified to correspond with the ratings of the battery 18.

This can be accomplished by designing different versions of the battery conditioner and charger (not shown) for use with different types of batteries or by a switch input (not shown) that is used to set operating (i.e., charging) parameters of the battery conditioner and charger 10.

Alternately, a microprocessor (not shown) can be included with corresponding software sufficient to control and to monitor all parameters and all functions including any preferred input settings useful to select different ratings and types of the battery 18.

The microprocessor can be used to control the performance of both a modified type of a power supply, a modified type of a voltage and current regulator, and a modified type of a pulse width modulator to achieve the same basic functionality as disclosed herein. Such a device could include a corresponding modified first charging stage and a modified second charging stage and a modified third charging stage to optimally charge any type or capacity (i.e., ampacity) of the battery 18.

It is also possible to include a display whereby selection of the particular type of battery 18 (its general category) that is being charged can occur and whereby the battery conditioner and charger 10 would contain information in an internal memory that automatically adjusts any or all of its operating parameters, as described above, to optimally suit the battery 18 being charged.

Similarly, if the battery 18 being charged is greater or less than a 12 VDC battery, the operating parameters of the battery conditioner and charger are adjusted accordingly.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A battery conditioner and charger for use with a lead-acid type of storage battery, comprising:
    (a) a power supply that is adapted to supply a first DC voltage to a storage battery and wherein said first DC voltage includes a peak voltage that is approximately equal to or greater than double the normal voltage output of said storage battery; and
    (b) means for regulating the application of said first DC voltage to said battery, wherein said means for regulating includes means for limiting an average voltage through said battery, wherein said means for limiting an average voltage includes a pulse width modulator that is adapted to supply to said battery a pulsed DC waveform of said first DC voltage, wherein said pulsed DC waveform includes a repetition rate that is equal to or greater than 120 pulses per second and equal to or less than 400 pulses per second.

2. The battery conditioner and charger of claim 1 wherein said means for regulating includes means for limiting an average current through said battery.

3. The battery conditioner and charger of claim 2 wherein said means for limiting an average current through said battery includes a current regulator.

4. The battery conditioner and charger of claim 1 wherein said means for limiting an average voltage includes a voltage regulator.

5. The battery conditioner and charger of claim 1 including feedback means for supplying an electrical signal to said pulse width modulator, and wherein said pulse width modulator varies a duty cycle of said pulsed DC waveform in response to said electrical signal.

6. The battery conditioner and charger of claim 1 for use with a 12 volt type of a lead-acid storage battery, comprising:
    (a) a first charging stage wherein a pulsed DC voltage that includes a peak voltage of approximately 42 VDC and a fifty percent duty cycle is applied to said storage battery;
    (b) a second charging stage wherein a second pulsed DC voltage that includes a peak voltage of approximately 42 VDC and a duty cycle that is less than fifty percent is applied to said storage battery for a first period of time; and
    (c) a third charging stage wherein a steady state DC voltage is applied to said storage battery for a second period of time.

7. The battery conditioner and charger of claim 6 wherein a transition from said first charging state into said second charging state occurs when an average current through said battery increases to 12 amperes.

8. The battery conditioner and charger of claim 6 wherein a transition from said second charging state into said third charging state occurs after a first period of time has elapsed.

9. The battery conditioner and charger of claim 8 wherein said first period of time includes twenty minutes.

10. The battery conditioner and charger of claim 8 wherein said third charging state terminates after a second period of time has elapsed and wherein when said third charging state terminates, said battery conditioner and charger shuts off.

11. The battery conditioner and charger of claim 10 wherein said second period of time includes four hours.

12. The battery conditioner and charger of claim 6 including means for monitoring a temperature of said battery, and wherein said battery conditioner and charger will cease to apply an electrical charge current to said battery when said temperature of said battery rises to a predetermined maximum temperature and wherein said battery conditioner and charger will resume to apply said electrical charge current to said battery when said temperature of said battery falls to a predetermined safe minimum temperature.

13. The battery conditioner and charger of claim 12 wherein said means for monitoring includes a temperature sensor that is adapted for placement proximate a cell of said battery and wherein said temperature sensor includes an output signal that is in proportion to said temperature of said battery.

14. The battery conditioner and charger of claim 12 wherein said predetermined maximum temperature is 113 degrees Fahrenheit and said predetermined safe minimum temperature is 85 degrees Fahrenheit.

15. The battery conditioner and charger of claim 1 for use with a 12 volt type of a lead-acid storage battery,
    wherein said power supply that supplies a regulated first regulated voltage output of 42 VDC and a regulated current output of 30 amperes;
    and comprising a voltage and current regulator for supplying a feedback signal useful for regulating an average current that is applied to said battery and an average voltage that is applied to said battery; and
    wherein said pulse width modulator applies a pulsed DC voltage to said battery from said power supply, and controls a duty cycle of said pulsed DC voltage, and wherein said feedback signal is supplied to said pulse width modulator and is used by said pulse width modulator to control an amount of electrical energy that is supplied to said battery.

16. The battery conditioner and charger of claim 1 for use with a 12 volt type of a lead-acid storage battery,
- wherein said power supply supplies a regulated first regulated voltage output of 42 VDC and a regulated current output of 30 amperes;
- and comprising a voltage and current regulator for supplying a feedback signal useful for regulating an average current that is applied to said battery and an average voltage that is applied to said battery;
- wherein said pulse width modulator applies a pulsed DC voltage to said battery from said power supply, and controls a duty cycle of said pulsed DC voltage, and wherein said feedback signal is supplied to said pulse width modulator and is used by said pulse width modulator to control an amount of electrical energy that is supplied to said battery; and
- wherein said battery conditioner and charger includes three charging states; and wherein a first of said three charging states includes said pulsed DC voltage that includes a peak voltage of approximately 42 VDC and a fifty percent duty cycle is applied to said storage battery until a predetermined average rate of current flow of twelve amperes through said battery is reached, and wherein a second of said three charging stages includes a second pulsed DC voltage that includes a peak voltage of approximately 42 VDC and a duty cycle that is less than fifty percent that is applied to said battery until a first period of time has elapsed, and wherein a third of said three charging states includes a steady state DC voltage is applied to said battery for a second period of time.

17. The battery conditioner and charger of claim 16 including a capacitor adapted for storing an electrical charge from said power supply and wherein when said pulse width modulator is applying said pulsed DC voltage to said battery from said power supply a total amount of current that is available to said battery includes at least a portion of said electrical charge that is stored in said capacitor plus the instantaneous output of said power supply.

18. The battery conditioner and charger of claim 16 wherein a first reference voltage of 21 VDC is applied to said voltage and current regulator during said first charging stage and wherein a second reference voltage of 14.8 VDC is applied to said voltage and current regulator during said second charging stage, and wherein said pulse width modulator is adapted to vary said duty cycle of said pulsed DC voltage that is applied to said battery so that an average voltage that is applied to said battery is equal to said first reference voltage during said first charging stage and is equal to said second reference voltage during said second charging stage.

19. The battery conditioner and charger of claim 18 wherein said voltage and current regulator is adapted to limit an average current to twenty amperes during said second charging stage.

20. The battery conditioner and charger of claim 1 wherein said first DC voltage includes a peak voltage that is greater than 2.8 Volts DC per cell of said storage battery.

21. The battery conditioner and charger of claim 1 wherein said first DC voltage includes a peak voltage per cell of said storage battery that if applied to said storage battery at a steady state would result in an out-gassing from said storage battery of an unsafe level of hydrogen gas from said battery.

\* \* \* \* \*